(12) United States Patent
Okawa

(10) Patent No.: US 8,541,955 B2
(45) Date of Patent: Sep. 24, 2013

(54) DISCHARGE LAMP LIGHTING DEVICE, PROJECTOR, AND DISCHARGE LAMP LIGHTING DEVICE CONTROL METHOD

(75) Inventor: Kazuo Okawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 568 days.

(21) Appl. No.: 12/810,417

(22) PCT Filed: Dec. 25, 2008

(86) PCT No.: PCT/JP2008/073550
§ 371 (c)(1),
(2), (4) Date: Jun. 24, 2010

(87) PCT Pub. No.: WO2009/084569
PCT Pub. Date: Jul. 9, 2009

(65) Prior Publication Data
US 2010/0277085 A1    Nov. 4, 2010

(30) Foreign Application Priority Data
Dec. 27, 2007  (JP) .................................. 2007-336430

(51) Int. Cl.
*G05F 1/00* (2006.01)
(52) U.S. Cl.
USPC ........... 315/291; 315/307; 315/224; 315/247; 315/209 R
(58) Field of Classification Search
USPC ............. 315/209 R, 224–226, 291, 293, 307, 315/308, 247, 185 S; 383/85
See application file for complete search history.

(56) References Cited

U.S. PATENT DOCUMENTS

| | | | |
|---|---|---|---|
| 6,278,244 B1 | 8/2001 | Hevinga et al. | |
| 6,504,323 B2 * | 1/2003 | Yuda et al. | 315/307 |
| 6,586,892 B2 | 7/2003 | Derra et al. | |
| 6,791,286 B2 * | 9/2004 | Matsumoto | 315/308 |
| 6,927,539 B2 * | 8/2005 | Arimoto et al. | 315/59 |
| 6,943,503 B2 | 9/2005 | Ozasa et al. | |
| 6,979,960 B2 * | 12/2005 | Okawa et al. | 315/291 |
| 7,358,686 B2 | 4/2008 | Deurloo | |

(Continued)

FOREIGN PATENT DOCUMENTS

| | | |
|---|---|---|
| JP | 2002-015883 A | 1/2002 |
| JP | 2002-533884 A | 10/2002 |

(Continued)

OTHER PUBLICATIONS

Search Report and Written Opinion received in International Application No. PCT/JP2008/073550; Jul. 9, 2009.

*Primary Examiner* — Tuyet Thi Vo
(74) *Attorney, Agent, or Firm* — ALG Intellectual Property, LLC

(57) ABSTRACT

Provided is an electric discharge lamp lighting device (10) including a control section (40) which performs first control operation for controlling at least the current value, frequency, duty ratio or waveform of a driving current (I) for driving an electric discharge lamp (90). The electric discharge lamp lighting device also includes a signal receiving section (50) for receiving a drive control signal (S) which can control at least the current value, frequency, duty ratio or waveform of the driving current (I) in mode different from the first control operation. The control section (40) performs second control operation for controlling at least the current value, frequency duty ratio or waveform of the driving current (I) based on the drive control signal (S), in the case where the signal receiving section (50) has received the drive control signal (S).

14 Claims, 5 Drawing Sheets

(56) References Cited

U.S. PATENT DOCUMENTS

| | | | |
|---|---|---|---|
| 7,368,881 B2 * | 5/2008 | Suganuma et al. | 315/291 |
| 7,508,144 B2 | 3/2009 | Yamauchi et al. | |
| 7,855,512 B2 * | 12/2010 | Ozasa et al. | 315/49 |
| 2007/0164687 A1 * | 7/2007 | Watanabe et al. | 315/291 |
| 2007/0278963 A1 * | 12/2007 | Wu et al. | 315/149 |

FOREIGN PATENT DOCUMENTS

| | | |
|---|---|---|
| JP | 2003-338394 A | 11/2003 |
| JP | 2005-050662 A | 2/2005 |
| JP | 2005-197181 A | 7/2005 |
| JP | 2005-522818 A | 7/2005 |
| JP | 2007-122917 A | 5/2007 |
| JP | 2007-265790 A | 10/2007 |
| JP | 2007-266088 A | 10/2007 |
| JP | 2007-273338 A | 10/2007 |
| JP | 2007-322456 A | 12/2007 |
| JP | 2008-060071 A | 3/2008 |
| WO | WO-00-38481 A | 6/2000 |
| WO | WO-03-047321 A | 6/2003 |

* cited by examiner

DISCHARGE LAMP LIGHTING DEVICE, PROJECTOR, AND DISCHARGE LAMP LIGHTING DEVICE CONTROL METHOD

TECHNICAL FIELD

The present invention relates to a discharge lamp lighting device, a projector, and a discharge lamp lighting device control method.

BACKGROUND ART

A discharge lamp, such as a high pressure mercury-vapor lamp or a metal halide lamp, is used as the light source of a projector. Optimum drive conditions (the current value, frequency, and waveform of a drive current) of a discharge lamp differ depending on the condition of the discharge lamp. For example, the optimum drive conditions differ between a point immediately after a lighting starts and after a certain amount of time has elapsed from the lighting, and the optimum drive conditions also differ between a discharge lamp used for a short period and a discharge lamp close to its lifetime limit. Also, the optimum drive conditions differ depending on the type of a discharge lamp.

The use of a discharge lamp under non-optimum drive conditions causes a discharge tube to be blackened or devitrified. Also, it causes an occurrence of a flicker too, for example, in the event of using the discharge lamp in a projector, the brightness of a projected video fluctuates during the use of the projector.

For this reason, for example, in JP-T-2002-533884, a discharge lamp lighting device is proposed wherein, a control circuit in which a plurality of drive conditions are preset being provided inside the discharge lamp lighting device, it is possible to appropriately select a drive condition in accordance with the condition of a discharge lamp.

DISCLOSURE OF THE INVENTION

However, as the control circuit in which the drive conditions are preset is inside the discharge lamp lighting device, it has not been possible, when the discharge lamp is lit, to change drive conditions to other than the preset drive conditions. Because of this, it has been difficult to flexibly change the design of the discharge lamp lighting device.

Also, as the optimum drive conditions differ depending on the type of the discharge lamp, there has been a need to prepare discharge lamp lighting devices separately, one for each type of discharge lamp.

Furthermore, in the case of a high pressure discharge lamp, as there are great differences in characteristics between individual ones, a control under drive conditions differing among single discharge lamps is required. Because of this, it has been very difficult to prepare a device which generates a compatible drive waveform for each single discharge lamp, a storage device (a memory), or the like, inside the discharge lamp lighting device (a ballast).

The invention, having been contrived bearing in mind the heretofore described kinds of problem, has an object of providing a discharge lamp lighting device wherein it is possible to freely set drive conditions of a discharge lamp from the exterior of the discharge lamp lighting device, a projector using the same, and a discharge lamp lighting device control method.

(1) A discharge lamp lighting device according to the invention, which includes a control section which carries out a first control operation which controls at least one of the current value, frequency, duty ratio, and waveform of a drive current for driving a discharge lamp, is characterized by including a signal reception section which receives a drive control signal which can control at least one of the current value, frequency, duty ratio, and waveform of the drive current in a form differing from the first control operation, wherein, in the event that the signal reception section has received the drive control signal, the control section, based on the drive control signal, carries out a second control operation which controls at least one of the current value, frequency, duty ratio, and waveform of the drive current.

According to the invention, it is possible to realize a discharge lamp lighting device wherein it is possible to freely set drive conditions of the discharge lamp from the exterior of the discharge lamp lighting device.

(2) The discharge lamp lighting device may be such that it includes a storage section which stores drive information relating to at least one of the current value, frequency, duty ratio, and waveform of the drive current, wherein, in the event that the signal reception section has not received the drive control signal, the control section, based on the drive information stored in the storage section, carries out the first control operation which controls at least one of the current value, frequency, duty ratio, and waveform of the drive current.

(3) The discharge lamp lighting device may be such that it includes a power control circuit which generates discharge lamp drive power, and an alternating current conversion circuit which, by inverting the polarity of a direct current output by the power control circuit with a given timing, generates and outputs the drive current for driving the discharge lamp, wherein the control section, by outputting to the power control circuit a current control signal for controlling the current value of the direct current, and outputting to the alternating current conversion circuit a control signal for controlling the timing of inverting the polarity of the drive current, controls at least one of the current value, frequency, duty ratio, and waveform of the drive current.

(4) The discharge lamp lighting device may be such that the power control circuit includes a switching control power circuit which outputs the direct current, and the control section, by outputting a pulse width modulation signal to the switching control power circuit as the current control signal, controls the current value of the direct current.

(5) The discharge lamp lighting device may be such that the switching control power circuit is a step-down chopper circuit.

(6) The discharge lamp lighting device may be such that the alternating current conversion circuit includes an inverter bridge circuit which generates and outputs the drive current.

(7) The discharge lamp lighting device may be such that it includes a determination section which determines whether or not the signal reception section has received the drive control signal, wherein the control section, in the event that the determination section determines that the drive control signal has been received, carries out the second control operation, and in the event that the determination section determines that the drive control signal has not been received, carries out the first control operation.

(8) The discharge lamp lighting device may be such that the determination section, in the event that the amplitude of the drive control signal has exceeded a threshold value, determines that the drive control signal has been received, and in the event that the amplitude of the drive control signal has not exceeded the threshold value, determines that the drive control signal has not been received.

(9) The discharge lamp lighting device may be such that it includes a conversion section which converts an analog signal into digital information, wherein the signal reception section receives the drive control signal as an analog signal corresponding to at least one of the current value, frequency, duty ratio, and waveform of the drive current, the conversion section converts the analog signal received by the signal reception section into digital information, and the control section carries out the second control operation based on the digital information converted by the conversion section.

(10) The discharge lamp lighting device may be such that the signal reception section receives the drive control signal as an analog signal having a polarity inversion timing corresponding to the timing of inverting the polarity of the drive current, and the control section controls the alternating current conversion circuit in such a way that the polarity of the drive current is inverted with a timing correlated to the timing of inverting the polarity of the drive control signal received by the signal reception section.

(11) The discharge lamp lighting device may be such that the signal reception section receives the drive control signal as an analog signal having a frequency corresponding to the frequency of the drive current, and the control section controls the alternating current conversion circuit in such a way as to supply the drive current at a frequency correlated to the frequency of the drive control signal received by the signal reception section.

(12) The discharge lamp lighting device may be such that the signal reception section receives the drive control signal as an analog signal having a duty ratio corresponding to the duty ratio of the drive current, and the control section controls the alternating current conversion circuit in such a way as to supply the drive current at a duty ratio correlated to the duty ratio of the drive control signal received by the signal reception section.

(13) The discharge lamp lighting device may be such that the signal reception section receives the drive control signal as an analog signal having an amplitude corresponding to the current value of the drive current, and the control section controls the power control circuit in such a way as to supply the drive current at a current value correlated to the amplitude of the drive control signal received by the signal reception section.

(14) The discharge lamp lighting device may be such that the signal reception section receives the drive control signal as an analog signal having a waveform corresponding to the waveform of the drive current, and the control section controls the power control circuit in such a way as to supply the drive current with a waveform correlated to the waveform of the drive control signal received by the signal reception section.

(15) The discharge lamp lighting device may be such that the drive control signal is supplied from a control section of a projector.

(16) The discharge lamp lighting device may be such that it includes an operation detection section which detects the drive voltage of the discharge lamp, and outputs drive voltage information, wherein the drive control signal is supplied from the control section of the projector based on the drive voltage information.

(17) A projector according to the invention is characterized by including the discharge lamp lighting device according to any one of these aspects.

(18) A discharge lamp lighting device control method according to the invention, being a method of controlling a discharge lamp lighting device which, including a signal reception section which receives a drive control signal which can control at least one of the current value, frequency, duty ratio, and waveform of a drive current for driving a discharge lamp, outputs the drive current, is characterized by carrying out a first control operation which controls at least one of the current value, frequency, duty ratio, and waveform of the drive current; the signal reception section receiving the drive control signal which can control at least one of the current value, frequency, duty ratio, and waveform of the drive current; and in the event that the signal reception section has received the drive control signal, based on the drive control signal, carrying out a second control operation which controls at least one of the current value, frequency, duty ratio, and waveform of the drive current.

BEST MODE FOR CARRYING OUT THE INVENTION

Hereafter, a detailed description will be given, using the drawings, of a preferred embodiment of the invention. The embodiment, to be described hereafter, does not unduly limit the contents of the invention described in the claims. Also, not all of the configurations, to be described hereafter, are indispensable constituent features of the invention.

Figure 1:
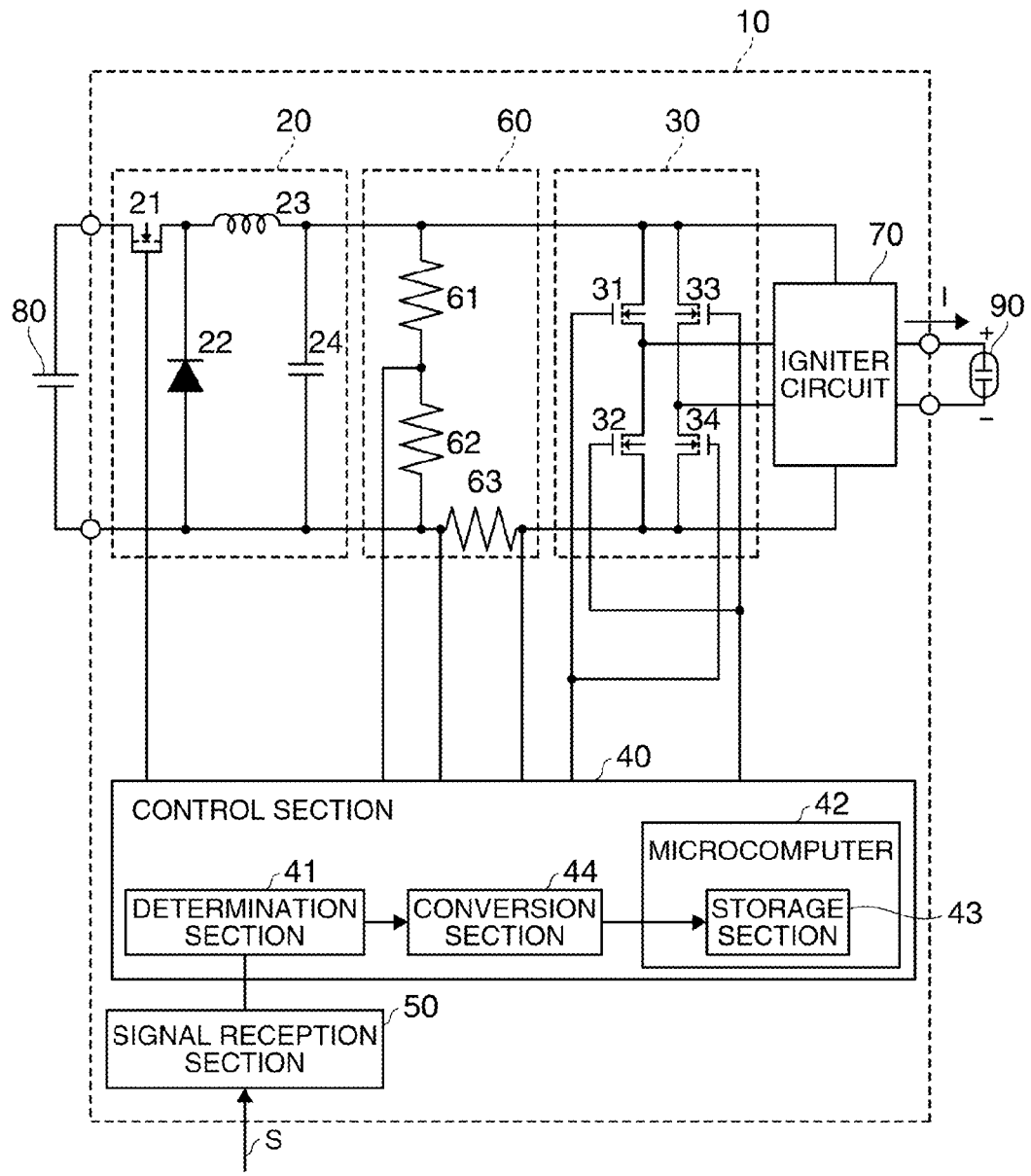
FIG. 1 is one example of a circuit diagram of a discharge lamp lighting device according to an embodiment of the invention.

1. Discharge Lamp Lighting Device (1) Configuration of Discharge Lamp Lighting Device FIG. 1 is one example of a circuit diagram of a discharge lamp lighting device according to the embodiment.

A discharge lamp lighting device 10 includes a power control circuit 20. The power control circuit 20 generates drive power supplied to a discharge lamp 90. The power control circuit 20 may be configured of, for example, a switching control power circuit. In the embodiment, the power control circuit 20 is configured of a step-down chopper circuit (a kind of switching control power circuit) which, having a direct current power source 80 as an input, steps down the input voltage thereof and outputs it.

The power control circuit 20 may be configured including a switch element 21, a diode 22, a coil 23, and a capacitor 24. The switch element 21 may be configured of, for example, a transistor. In the embodiment, one end of the switch element 21 is connected to the positive voltage side of the direct current power source 80, and the other end is connected to the cathode terminal of the diode 22 and one end of the coil 23. Also, one end of the capacitor 24 is connected to the other end of the coil 23, and the other end of the capacitor 24 is connected to the anode terminal of the diode 22 and the negative voltage side of the direct current power source 80. A current control signal is input into the control terminal of the switch element 21 from a control section 40, controlling a turning on and off of the switch element 21. As the current control signal, for example, a pulse width modulation (PWM) signal may be used.

Herein, on the switch element 21 being turned on, a current flows through the coil 23, and energy is stored in the coil 23. Subsequently, on the switch element 21 being turned off, the energy stored in the coil 23 is discharged in a pathway passing through the capacitor 24 and diode 22. As a result thereof, direct current power is generated in accordance with the proportion of time for which the switch element 21 is turned on. By this means, the power control circuit 20 outputs a direct current fixed based on the direct current power and the drive voltage of the discharge lamp 90.

The discharge lamp lighting device 10 includes an alternating current conversion circuit 30. The alternating current conversion circuit 30, by inverting the polarity of the direct current output by the power control circuit 20 with a given timing, generates a discharge lamp drive current with an optional frequency and duty ratio. In the embodiment, the alternating current conversion circuit 30 is configured of an inverter bridge circuit (a full bridge circuit).

The alternating current conversion circuit 30, being configured including first to fourth switch elements 31 to 34 such as transistors, is configured by mutually connecting the series-connected first and second switch elements 31 and 32 and the series-connected third and fourth switch elements 33 and 34 in parallel. A control signal is input from the control section 40 into each of the control terminals of the first to fourth switch elements 31 to 34, controlling a turning on and off of the first to fourth switches 31 to 34.

The alternating current conversion circuit 30, by repeatedly turning on and off the first and fourth switch elements 31 and 34 and the second and third switch elements 32 and 33 alternately, alternately inverts the polarity of the output voltage of the power control circuit 20, and outputs a drive current I with a controlled frequency from the common connection point of the first and second switch elements 31 and 32, and the common connection point of the third and fourth switch elements 33 and 34.

That is, a control is conducted in such a way that the second and third switch elements 32 and 33 are turned off when the first and fourth switch elements 31 and 34 are turned on, and the second and third switch elements 32 and 33 are turned on when the first and fourth switch elements 31 and 34 are turned off. Consequently, a drive current I flowing through the first switch element 31, discharge lamp 90, and fourth switch element 34 in this order from the one end of the capacitor 24 is generated when the first and fourth switch elements 31 and 34 are turned on. Also, a drive current I flowing through the third switch element 33, discharge lamp 90, and second switch element 32 in this order from the one end of the capacitor 24 is generated when the second and third switch elements 32 and 33 are turned on.

The discharge lamp lighting device 10 includes the control section 40. The control section 40 carries out a first control operation which controls at least one of the current value, frequency, duty ratio, and waveform of the drive current I, and a second control operation which controls at least one of the current value, frequency, duty ratio, and waveform of the drive current I, in a form differing from the first control operation, based on a drive control signal S, to be described hereafter. The duty ratio of the drive current I is the ratio of the length of period for which the drive current I is of positive polarity to the length of one cycle of the drive current I.

The control section 40, by outputting to the power control circuit 20 a current control signal for controlling the current value of the direct current output by the power control circuit 20, and outputting to the alternating current conversion circuit 30 a control signal for controlling the timing of inverting the polarity of the drive current I, controls at least one of the current value, frequency, duty ratio, and waveform of the drive current I of the discharge lamp 90.

In the embodiment, the control section 40 is configured including a determination section 41 and a microcomputer 42. The determination section 41 may be provided independently of the control section 40. Also, the determination section 41 may be included in, for example, the microcomputer 42.

The determination section 41 determines an existence or otherwise of the drive control signal S. The determination section 41 may, for example, in the event that the amplitude of the drive control signal S has exceeded a threshold value, determine that the drive control signal S has been received, and in the event that the amplitude of the drive control signal has not exceeded the threshold value, determine that the drive control signal S has not been received.

In the event that the determination section 41 determines that the drive control signal S has been received, the microcomputer 42, based on the drive control signal S, carries out the second control operation which controls at least one of the current value, frequency, duty ratio, and waveform of the drive current I, and in the event that the determination section 41 determines that the drive control signal S has not been received, the microcomputer 42, based on drive information stored in a storage section 43, to be described hereafter, carries out the first control operation which controls at least one of the current value, frequency, duty ratio, and waveform of the drive current I.

The microcomputer 42 may control the power control circuit 20 and alternating current conversion circuit 30 in such a way as to drive the discharge lamp 90 under desired drive conditions, while monitoring the drive voltage and drive current I of the discharge lamp 90 detected by an operation detection section 60, to be described hereafter, provided inside the discharge lamp lighting device 10.

In the embodiment, the microcomputer 42 is configured including the storage section 43. The storage section 43 may be provided independently of the control section 40 or microcomputer 42.

The microcomputer 42 may, based on the information stored in the storage section 43, control the power control circuit 20 and alternating current conversion circuit 30. For example, drive information relating to at least one of the current value, frequency, duty ratio, and waveform of the drive current I during the first control operation may be stored in the storage section 43. Also, for example, information relating to the current value, frequency, duty ratio, and waveform of the drive current I during the second control operation may be stored in the storage section 43 based on the drive control signal S.

The control section 40 may include a conversion section 44, which converts an analog signal to digital information, partway along a pathway from a signal reception section 50, to be described hereafter, to the storage section 43 (either before or after the determination section 41). The conversion section 44 may be provided independently of the control section 40.

The discharge lamp lighting device 10 includes the signal reception section 50. The signal reception section 50 receives the input of the drive control signal S which can control at least one of the current value, frequency, duty ratio, and waveform of the drive current I.

The signal reception section 50 may include, for example, a phototransistor, and be configured so that the signal source of the drive control signal S and the discharge lamp lighting device 10 are insulated by inputting the drive control signal S as an optical signal passing through a light emitting diode.

The signal reception section 50 may receive the drive control signal S which has passed through, for example, a photocoupler. Also, the signal reception section 50 may include, for example, a photocoupler, and receive the drive control signal S via the photocoupler.

In the event that it is not necessary to insulate the signal source of the drive control signal S and the discharge lamp lighting device 10, the signal reception section 50 may include, for example, a buffer amplifier, and receive the drive control signal S via the buffer amplifier.

For example, the signal reception section 50 may receive the drive control signal S including digital information corresponding to at least one of the current value, frequency, duty ratio, and waveform of the drive current I, and the control section 40 may carry out the second control operation based on the digital information included in the drive control signal S.

Also, for example, the signal reception section 50 may receive the drive control signal S as an analog signal corresponding to at least one of the current value, frequency, duty ratio, and waveform of the drive current I, the conversion section 44 may convert the analog signal received by the signal reception section 50 into digital information, and the control section 40 may carry out the second control operation based on the digital information converted by the conversion section 44.

The discharge lamp lighting device 10 may include the operation detection section 60. The operation detection section 60 may detect an operation of the discharge lamp 90, for example, the drive voltage or drive current I of the discharge lamp, and output drive voltage information or drive current information. In the embodiment, the operation detection section 60 is configured including first to third resistors 61 to 63.

The operation detection section 60 detects a drive voltage based on a voltage divided by the mutually series-connected first and second resistors 61 and 62 connected in parallel with the discharge lamp 90, and detects the drive current I based on a voltage generated in the third resistor 63 connected in series with the discharge lamp 90.

The discharge lamp lighting device 10 may include an igniter circuit 70. The igniter circuit 70 operates only when the discharge lamp 90 starts to light, and supplies between the electrodes of the discharge lamp 90 with a high voltage (a voltage higher than during the first control operation) required to break down the insulation between the electrodes of the discharge lamp 90 and form a discharge path when the discharge lamp 90 starts to light. In the embodiment, the igniter circuit 70 is connected in parallel with the discharge lamp 90.

(2) Operation of Discharge Lamp Lighting Device

Figure 2:
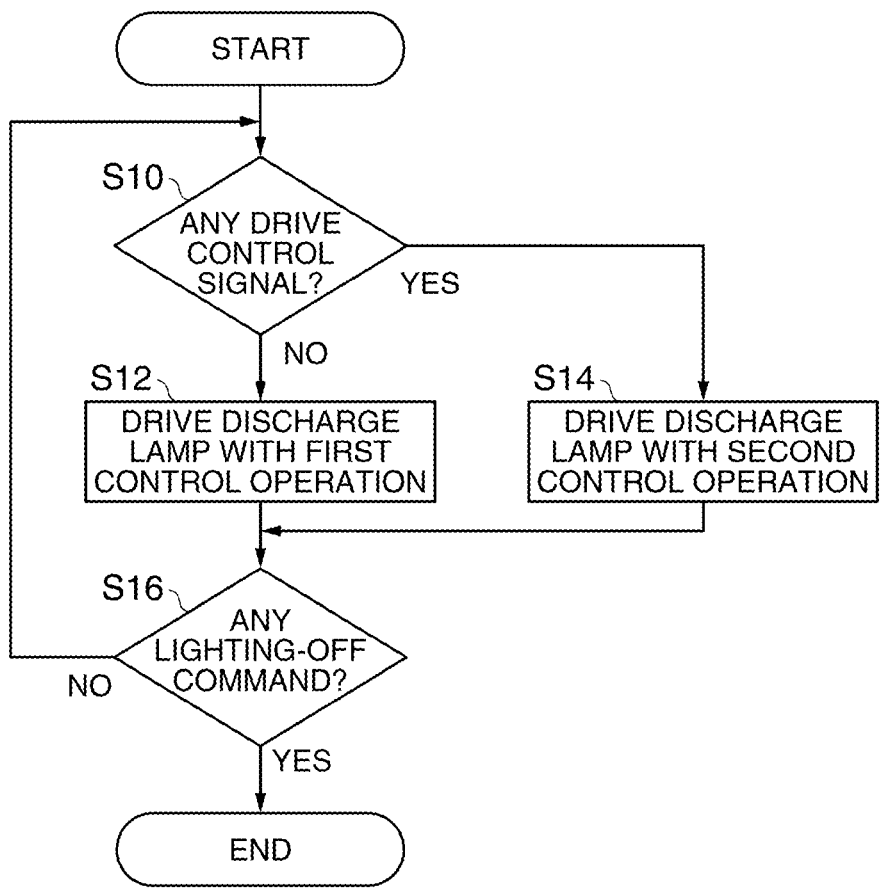
FIG. 2 is a flowchart for illustrating an operation of the discharge lamp lighting device according to the embodiment of the invention.

Next, a description will be given of an operation of the discharge lamp lighting device 10 according to the embodiment. FIG. 2 is a flowchart for illustrating an operation of the discharge lamp lighting device 10.

The discharge lamp lighting device 10, after receiving a lighting command in response to a user's operation or the like, determines an existence or otherwise of the drive control signal S (step S10). The determination of the existence or otherwise of the drive control signal S is carried out by the determination section 41. The determination section 41 may, for example, in the event that the amplitude of the drive control signal S has exceeded the threshold value, determine that the drive control signal S has been received, and in the event that the amplitude of the drive control signal S has not exceeded the threshold value, determine that the drive control signal S has not been received.

The threshold value is set at a value sufficient to determine whether or not a significant signal has been input as the drive control signal S. By this means, it is possible to prevent a malfunction due to an input of noise or the like.

In the event that it is determined that the drive control signal S has not been received (in the case of No in step S10), the discharge lamp lighting device 10 drives the discharge lamp 90 with the first control operation (step S12). The first control operation is an operation of controlling the discharge lamp 90 with the drive current I having the current value, frequency, duty ratio, or waveform set in the discharge lamp lighting device 10. Drive information relating to the current value, frequency, duty ratio, or waveform set in the discharge lamp lighting device 10 may be stored in, for example, the storage section 43.

In the event that it is determined in step S12 that the drive control signal S has been received (in the case of Yes in step S12), the discharge lamp lighting device 10 drives the discharge lamp 90 with the second control operation (step S14).

The second control operation is an operation of controlling at least one of the current value, frequency, duty ratio, and waveform of the drive current I based on the drive control signal S, thus controlling the discharge lamp 90.

For example, the signal reception section 50 may receive the drive control signal S including digital information corresponding to at least one of the current value, frequency, duty ratio, and waveform of the drive current I, and the control section 40 may carry out the second control operation based on the digital information included in the drive control signal S.

Also, for example, the signal reception section 50 may receive the drive control signal S as an analog signal corresponding to at least one of the current value, frequency, duty ratio, and waveform of the drive current I, the conversion section 44 may convert the analog signal received by the signal reception section 50 into digital information, and the control section 40 may carry out the second control operation based on the digital information converted by the conversion section 44.

In this case, for example, the signal reception section 50 may receive the drive control signal S as an analog signal having a polarity inversion timing corresponding to the timing of inverting the polarity of the drive current I, and the control section 40 may control the alternating current conversion circuit 30 in such a way that the polarity of the drive current I is inverted with a timing correlated to the timing of inverting the polarity of the drive control signal S received by the signal reception section 50.

Also, for example, the signal reception section 50 may receive the drive control signal S as an analog signal having a frequency corresponding to the frequency of the drive current I, and the control section 40 may control the alternating current conversion circuit 30 in such a way as to supply the drive current I using a frequency correlated to the frequency of the drive control signal S received by the signal reception section 50.

Also, for example, the signal reception section 50 may receive the drive control signal S as an analog signal having a duty ratio corresponding to the duty ratio of the drive current I, and the control section 40 may control the alternating current conversion circuit 30 in such a way as to supply the drive current I using a duty ratio correlated to the duty ratio of the drive control signal S received by the signal reception section 50.

Also, for example, the signal reception section 50 may receive the drive control signal S as an analog signal having an amplitude corresponding to the current value of the drive current I, and the control section 40 may control the power control circuit 20 in such a way as to supply the drive current I using a current value correlated to the amplitude of the drive control signal S received by the signal reception section 50.

Also, for example, the signal reception section 50 may receive the drive control signal S as an analog signal having a waveform corresponding to the waveform of the drive current I, and the control section 40 may control the power control circuit 20 in such a way as to supply the drive current I using a waveform correlated to the waveform of the drive control signal S received by the signal reception section 50.

Figure 3:
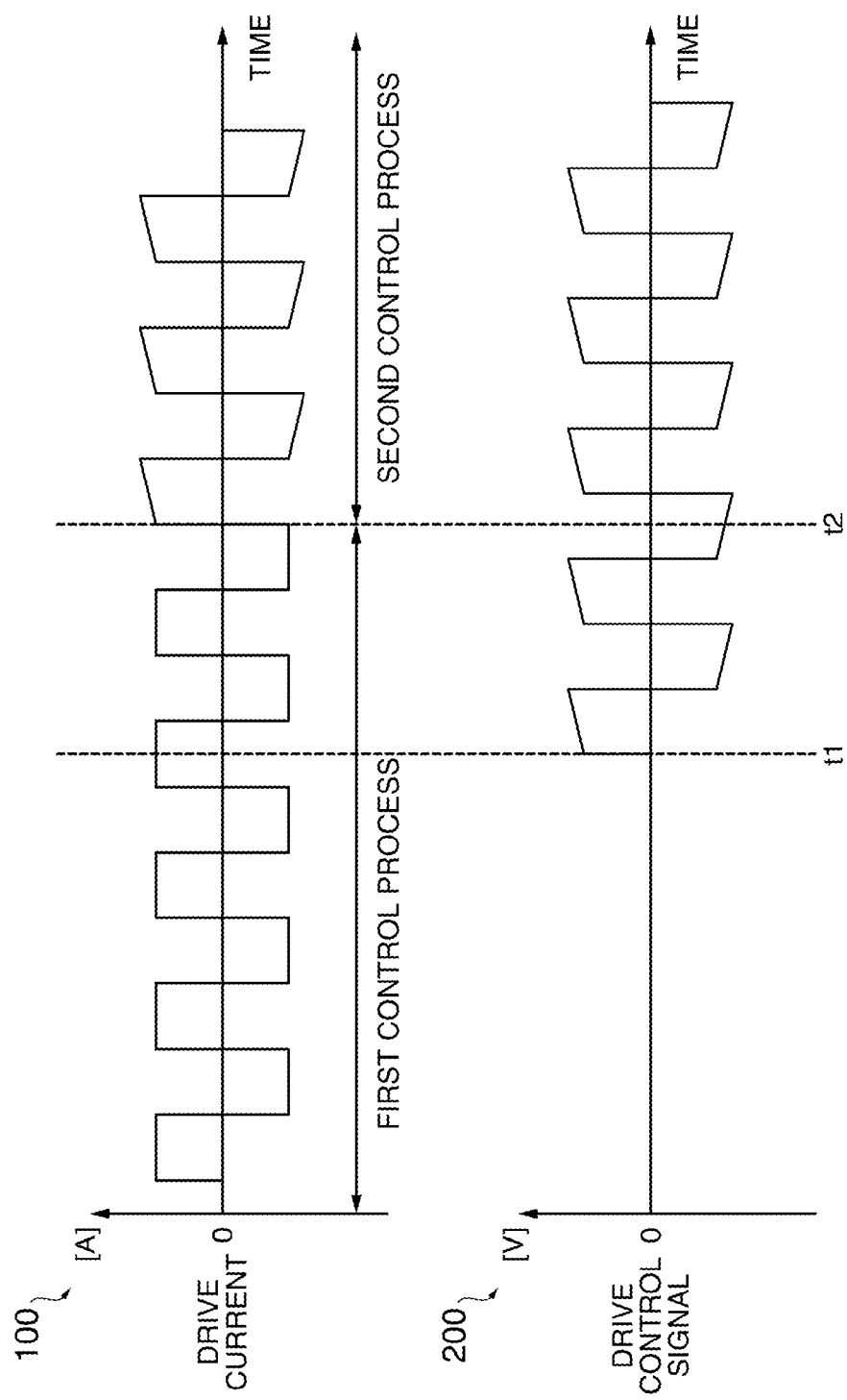
FIG. 3 is a timing chart showing one example of a correspondence relationship between a drive current I and a drive control signal S.

FIG. 3 is a timing chart showing one example of a correspondence relationship between the drive current I and drive control signal S. The horizontal axis of the timing chart shown in 100 of FIG. 3 is time, and the vertical axis is the current value of the drive current I. The horizontal axis of the timing chart shown in 200 of FIG. 3 is time, and the vertical axis is the voltage value of the drive control signal S.

The drive control signal S is not input into the signal reception section 50 before a time t1. In this case, the control section 40 carries out a first control process. In the example shown in 100 of FIG. 3, a drive current I during the first control process has rectangular waves with a duty ratio of 50% at a frequency f1.

The drive control signal S is input into the signal reception section 50 at and after the time t1. In the example shown in 200 of FIG. 3, the drive control signal S has a waveform of which the duty ratio is 50% at the frequency f1, and the absolute value of the voltage value increases monotonously in a straight line within a half cycle.

The drive control signal S input into the signal reception section 50 as an analog waveform is converted into digital information (sampled) by the conversion section 44, and stored in the storage section 43. The control section 40, based on the digital information stored in the storage section 43, carries out a second control process from a time t2. The time t2 is, for example, a time after a time required for the sampling and a generation of the waveform of the drive current I has elapsed from the time t1. Also, the time t2 may be synchronized with the timing of inverting the polarity of the drive current I. A drive current I during the second control process, in the same way as the drive control signal S, has a waveform of which the duty ratio is 50% at the frequency f1, and the absolute value of the current value increases monotonously in a straight line within a half cycle.

In the example shown in FIG. 3, a description has been given of an example in which the waveform of the drive current I is changed based on the drive control signal S, but it is possible, using the same technique, to set the drive conditions by optionally combining the conditions of the current value, frequency, duty ratio, and waveform of the drive current I.

In this way, with the discharge lamp lighting device 10 in the embodiment, the degree of freedom in setting the drive conditions is increased by the fact that it is possible to receive the drive control signal S as the analog signal, and that it is possible, based on the amplitude, frequency, duty ratio, or waveform sampled by the conversion section 44, to set the current value, frequency, duty ratio, or waveform of the drive current I.

After step S14 in FIG. 2, the discharge lamp lighting device 10, in response to the user's operation or the like, determines an existence or otherwise of an extinction command (step S16). The determination in step S16 may be carried out by, for example, the control section 40. If there is an extinction command (in the case of Yes in step S16), the discharge lamp lighting device 10 finishes the drive of the discharge lamp 90. If there is no extinction command (in the case of No in step S16), the discharge lamp lighting device 10 repeats steps S10 to S16.

Figure 4:
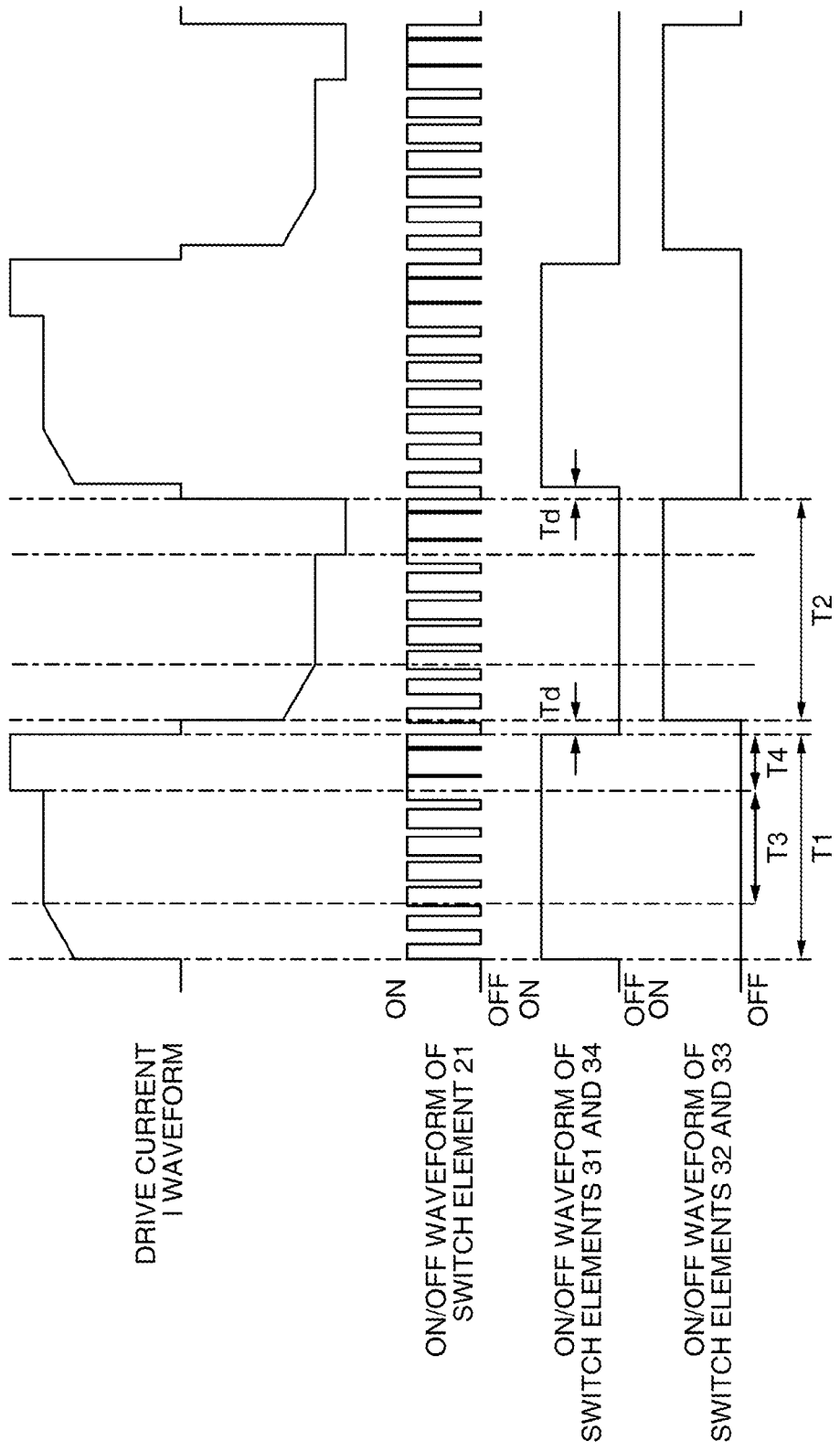
FIG. 4 is a timing chart for illustrating an operation of the discharge lamp lighting device according to the embodiment of the invention.

FIG. 4 is a timing chart showing one example of a relationship between the waveform of the drive current I and the waveforms of the control signals from the control section 40 to the switch element 21 of the power control circuit 20 and the first to fourth switch elements 31 to 34 of the alternating current conversion circuit 30. In FIG. 4, the waveform of the drive current I, the waveform of the current control signal to the switch element 21, the waveform of the control signal to the first and fourth switch elements 31 and 34, and the waveform of the control signal to the second and third switch elements 32 and 33, are shown in order from the top. The wave height of the waveform of the drive current I represents a current value. Also, for example, in the event that the switch element 21 and first to fourth switch elements 31 to 34 are configured of field effect transistors (FET's), the wave height of the control signal waveform represents a voltage value.

In the discharge lamp lighting device 10 according to the embodiment, in an interval in which the waveform of the control signal to the first and fourth switch elements 31 and 34 is turned on, for example, in an interval T1, the waveform of the drive current I indicates a positive current value. In an interval in which the waveform of the control signal to the second and third switch elements 32 and 33 is turned on, for example, in an interval T2, the waveform of the drive current I indicates a negative current value. In order to prevent a short circuit of the inverter bridge circuit (full bridge circuit) configuring the alternating current conversion circuit 30, the control signal to the first and fourth switch elements 31 and 34, and the control signal to the second and third switch elements 32 and 33, are controlled in such a way as not to be turned on simultaneously. The short circuit of the inverter bridge circuit (full bridge circuit) may be prevented by setting an interval Td, in which the control signal to the first and fourth switch elements 31 and 34, and the control signal to the second and third switch elements 32 and 33, are turned off simultaneously, between the interval T1 and interval T2. In the interval Td, the waveform of the drive current I indicates a current value of zero.

In the discharge lamp lighting device 10 according to the embodiment, the absolute value of the current value indicated by the waveform of the drive current I is proportional to a proportion (duty ratio) of time for which the switch element 21 is turned on in a corresponding interval. For example, by conducting a control in such a way that the proportion (duty ratio) of time for which the switch element 21 is turned on is greater in an interval T4 than in an interval T3, it is possible to conduct a control in such a way that the absolute value of the current value of the drive current I is relatively greater in the interval T4 than in the interval T3.

Consequently, by optionally combining the control signals from the control section 40 to the switch element 21 of the power control circuit 20 and the first to fourth switch elements 31 to 34 of the alternating current conversion circuit 30, it is possible to optionally set the current value, frequency, duty ratio, and waveform of the drive current I.

In this way, by the discharge lamp lighting device 10 being configured so that the waveform of the control signals from the control section 40 to the power control circuit 20 and alternating current conversion circuit 30 can be controlled based on the drive control signal S, it is possible to realize a discharge lamp lighting device wherein it is possible to freely set the drive conditions of the discharge lamp from the exterior of the discharge lamp lighting device 10.

As typical parameters for determining the drive conditions (the current value, frequency, duty ratio, and waveform of the drive current I) of the discharge lamp 90, there are a time for which the discharge lamp is lit, the number of times the discharge lamp is lit, a time elapsing after the discharge lamp has last been extinguished, and the like, in addition to an initial discharge lamp voltage, the latest discharge lamp voltage, and an existence or otherwise of an occurrence of a flicker during a lighting of the discharge lamp. Among them, items of information relating to the lighting history of the discharge lamp, such as a time for which the discharge lamp is lit, the number of times the discharge lamp is lit, and a time elapsing after the discharge lamp has last been extinguished, normally remaining as a record on the side of a device such as, for example, a projector using the discharge lamp, are parameters which have heretofore been difficult to utilize due to their not remaining on the discharge lamp lighting device side.

In the discharge lamp lighting device 10 according to the embodiment, as it is possible, based on the drive control signal S, to control the waveform of the drive current I from the exterior of the discharge lamp lighting device 10, for example, by supplying the drive control signal S from a main control section of a projector or the like, it is possible, utilizing the parameters which have heretofore been difficult to utilize, to realize a discharge lamp lighting device wherein it is possible to drive the discharge lamp 90 under more appropriate drive conditions (the current value, frequency, duty ratio, and waveform of the drive current I).

For example, in the event that a temporal change (rise or fall) in the drive voltage of the discharge lamp 90 has been detected, or in the event that a flicker has been detected, by the operation detection section 60, it is possible for the main control section of the projector or the like, based on the drive voltage information, and furthermore, by also taking into account information relating to the lighting history of the discharge lamp, such as a time for which the discharge lamp 90 is lit, the number of times the discharge lamp 90 is lit, and a time elapsing after the discharge lamp 90 has last been extinguished, to supply the discharge lamp lighting device 10 with the drive control signal S for setting a more appropriate current value, frequency, duty ratio, and waveform of the drive current I, and drive the discharge lamp 90. By this means, it is possible to prevent an occurrence of a flicker and a change in luminance.

2. Projector

Figure 5:
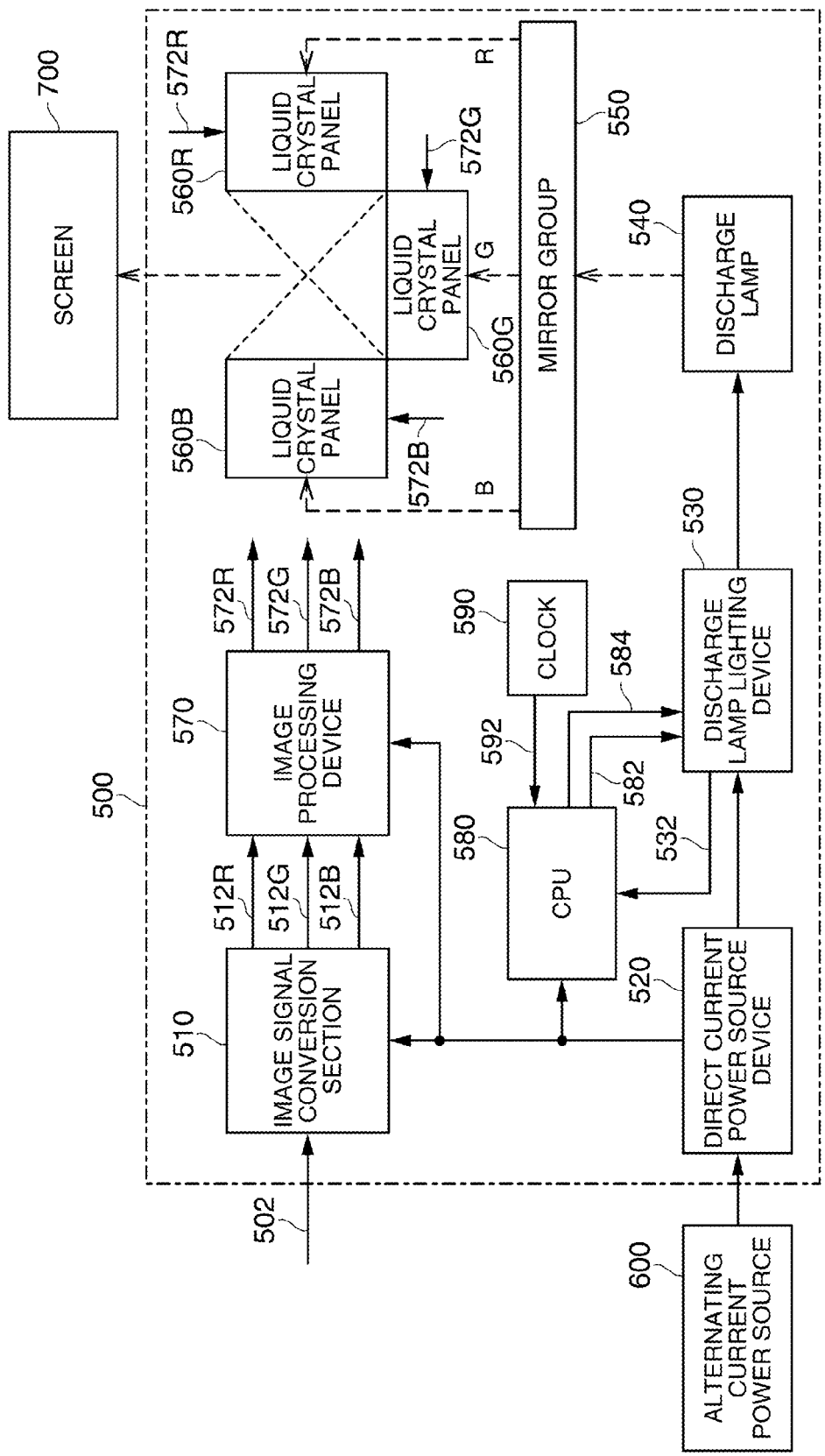
FIG. 5 is one example of a configuration of a projector according to the embodiment of the invention.

FIG. 5 is a diagram showing one example of a configuration of a projector according to the embodiment. A projector 500 includes an image signal conversion section 510, a direct current power source device 520, a discharge lamp lighting device 530, a discharge lamp 540, a mirror group 550, liquid crystal panels 560R, 560G, and 560B, and an image processing device 570.

The image signal conversion section 510 converts an image signal 502 (a luminance-color difference signal, an analog RGB signal, or the like) input from the exterior into a digital RGB signal with a predetermined word length, generates image signals 512R, 512G, and 512B, and supplies them to the image processing device 570.

The image processing device 570 carries out an image processing on each of the three image signals 512R, 512G, and 512B, and outputs drive signals 572R, 572G, and 572B for driving the liquid crystal panels 560R, 560G, and 560B respectively.

The direct current power source device 520 converts an alternating current voltage supplied from an external alternating current power source 600 into a certain direct current voltage, and supplies the direct current voltage to the image signal conversion section 510 and image processing device 570 on the secondary side of a transformer (although not shown in the diagram, included in the direct current power source device 520) and the discharge lamp lighting device 530 on the primary side of the transformer.

The discharge lamp lighting device 530, when activated, generates a high voltage between the electrodes of the discharge lamp 540, causing an insulation breakdown and forming a discharge path, and supplies a drive current for the discharge lamp 540 to maintain discharge afterwards. In the embodiment, a discharge lamp lighting device with the same configuration as the discharge lamp lighting device 10 described using FIG. 1 is used.

A luminous flux emitted by the discharge lamp 540 is split into color lights R, G, and B through two dichroic mirrors included in the mirror group 550, and they are reflected by the other mirrors, and transmitted through their respective liquid crystal panels 560R, 560G, and 560B.

Images in accordance with the drive signals 572R, 572G, and 572B being displayed on the liquid crystal panels 560R, 560G, and 560B respectively, the luminance of the color lights falling incident on the corresponding liquid crystal panels is modulated in accordance with the images, and the images are synthesized again by a dichroic prism, and projected onto a screen 700.

A CPU 580 controls operations ranging from the starting to an extinction of a lighting of the projector. The projector is powered on and, on the output voltage of the direct current power source device 520 reaching a predetermined value, the CPU 580 generates a lighting signal 582, and supplies it to the discharge lamp lighting device 530. Also, the CPU 580 acquires information relating to the lighting history of the discharge lamp, such as a time for which the discharge lamp is lit, the number of times the discharge lamp is lit, and a time elapsing after the discharge lamp has last been extinguished. Furthermore, the CPU 580 supplies the discharge lamp lighting device 530 with a drive control signal 584 which controls at least one of the current value, frequency, and waveform of a drive current which drives the discharge lamp 540. Also, the CPU 580 may receive drive voltage information 532 of the discharge lamp 540 from the discharge lamp lighting device 530.

A clock 590 can, for example, operate with a backup battery even when the projector 500 is powered off, and constantly output current time information 592 via a network or electric wave.

With the projector 500 configured in this way, as it is possible to freely set the drive conditions of the discharge lamp 540 from the exterior of the discharge lamp lighting device 530 (in the embodiment, from the CPU 580), it is possible to achieve a sharing of the discharge lamp lighting device 530 which has heretofore been of a designated design in accordance with specifications of each lamp, and it is possible to realize a reduction in cost of a projector which is a final product.

Also, it is possible to realize a projector which can drive the discharge lamp 540 under more appropriate drive conditions (the current value, frequency, duty ratio, and waveform of the drive current I) by utilizing parameters which have heretofore been difficult to utilize due to the fact that no history remains on the discharge lamp lighting device side, like information relating to the discharge lamp lighting history, such as a time for which the discharge lamp is lit, the number of times the discharge lamp is lit, and a time elapsing after the discharge lamp has last been extinguished.

For example, in the event that the CPU 580, based on the drive voltage information 532, has detected a temporal change (rise or fall) in the drive voltage of the discharge lamp 540, or an occurrence of a flicker, it is possible for the CPU 580, based on the drive voltage information 532, and furthermore, by taking into account information relating to the discharge lamp lighting history, such as a time for which the discharge lamp 540 is lit, the number of times the discharge lamp 540 is lit, and a time elapsing after the discharge lamp 540 has last been extinguished, to supply the discharge lamp lighting device 530 with the drive control signal 584 for setting more appropriate current value, frequency, and waveform of the drive current, and drive the discharge lamp 540. By this means, it is possible to prevent an occurrence of a flicker, or a change in luminance.

The invention, not being limited to the embodiment, can be variously modified and implemented without departing from the scope of the invention.

The invention includes essentially the same configuration as the configuration described in the embodiment (for example, configurations whose functions, methods, and results are the same, or configurations whose objects and advantages are the same). Also, the invention includes a configuration which is replaced with a nonessential portion of the configuration described in the embodiment. Also, the invention includes a configuration which performs the same working effect, or a configuration which can achieve the same object, as the configuration described in the embodiment. Also, the invention includes a configuration with a publicly known art added to the configuration described in the embodiment.

The invention claimed is:

1. A discharge lamp lighting device comprising:
   a control section carrying out a first control operation which controls at least one of the current value, frequency, duty ratio, and waveform of a drive current for driving a discharge lamp; and
   a signal reception section receiving, from an exterior of the discharge lamp lighting device, a drive control signal for controlling the current value, frequency, duty ratio, and waveform of the drive current of a second control operation in a form differing from the first control operation, the drive control signal being an analog signal having a frequency corresponding to the frequency of the drive current of the second control operation, a duty ratio corresponding to the duty ratio of the drive current of the second control operation, an amplitude corresponding to the current value of the drive current of the second control operation, and a waveform corresponding to the waveform of the drive current of the second control operation, and
   in the event that the signal reception section has received the drive control signal, the control section, based on the drive control signal, carries out the second control operation which controls the current value, frequency, duty ratio, and waveform of the drive current.

2. The discharge lamp lighting device according to claim 1, further comprising:
   a storage section storing drive information relating to at least one of the current value, frequency, duty ratio, and waveform of the drive current, wherein
      in the event that the signal reception section has not received the drive control signal, the control section, based on the drive information stored in the storage section, carries out the first control operation which controls at least one of the current value, frequency, duty ratio, and waveform of the drive current.

3. The discharge lamp lighting device according to claim 1, further comprising:
   a conversion section that converts an analog signal into digital information, wherein
      the conversion section converts the analog signal received by the signal reception section into digital information, and
      the control section carries out the second control operation based on the digital information converted by the conversion section.

4. A projector comprising:
   the discharge lamp lighting device according to claim 1.

5. The method of claim 1, wherein the current value, frequency, duty ratio, and waveform of the drive control signal are determined in accordance with a lighting history of the discharge lamp.

6. The discharge lamp lighting device according to claim 1, further comprising:
   a determination section determining whether or not the signal reception section has received the drive control signal, wherein
      the control section, in the event that the determination section determines that the drive control signal has been received, carries out the second control operation, and in the event that the determination section determines that the drive control signal has not been received, carries out the first control operation.

7. The discharge lamp lighting device according to claim 6, wherein
   the determination section, in the event that the amplitude of the drive control signal has exceeded a threshold value, determines that the drive control signal has been received, and in the event that the amplitude of the drive control signal has not exceeded the threshold value, determines that the drive control signal has not been received.

8. The discharge lamp lighting device according to claim 1, wherein
   the drive control signal is supplied from a control section of a projector.

9. The discharge lamp lighting device according to claim 8, further comprising:
   an operation detection section which detects the drive voltage of the discharge lamp, and outputs drive voltage information, wherein
      the drive control signal is supplied from the control section of the projector based on the drive voltage information.

10. The discharge lamp lighting device according to claim 1, further comprising:
   a power control circuit generating discharge lamp drive power; and
   an alternating current conversion circuit generating and outputting the drive current for driving the discharge lamp by inverting the polarity of a direct current output by the power control circuit with a given timing, wherein
      the control section, by outputting to the power control circuit a current control signal for controlling the current value of the direct current, and outputting to the alternating current conversion circuit a control signal for controlling the timing of inverting the polarity of the drive current, controls at least one of the current value, frequency, duty ratio, and waveform of the drive current.

11. The discharge lamp lighting device according to claim 10, wherein
the power control circuit includes a switching control power circuit which outputs the direct current, the control section, by outputting a pulse width modulation signal to the switching control power circuit as the current control signal, controls the current value of the direct current.

12. The discharge lamp lighting device according to claim 11, wherein
the switching control power circuit is a step-down chopper circuit.

13. The discharge lamp lighting device according to claim 10, wherein
the alternating current conversion circuit includes an inverter bridge circuit which generates and outputs the drive current.

14. A method of controlling a discharge lamp lighting device outputting a drive current for driving a discharge lamp, comprising the step of:

carrying out a first control operation controlling at least one of the current value, frequency, duty ratio, and waveform of the drive current;

receiving, from an exterior of the discharge lamp lighting device, a drive control signal for controlling the current value, frequency, duty ratio, and waveform of the drive current of a second control operation in a form differing from the first control operation, the drive control signal being an analog signal having a frequency corresponding to the frequency of the drive current of the second control operation, a duty ratio corresponding to the duty ratio of the drive current of the second control operation, an amplitude corresponding to the current value of the drive current of the second control operation, and a waveform corresponding to the waveform of the drive current of the second control operation; and carrying out a second control operation for controlling the current value, frequency, duty ratio, and waveform of the drive current based on the drive control signal in the event that the drive control signal has been received.

* * * * *